United States Patent [19]
Kolbe

[11] 3,980,317
[45] Sept. 14, 1976

[54] VEHICLE BANKING ARM CONSTRUCTION

[76] Inventor: Joachim Kolbe, 5126 Haskell Ave., Encino, Calif. 91316

[22] Filed: Oct. 29, 1974

[21] Appl. No.: 518,471

Related U.S. Application Data

[63] Continuation of Ser. No. 451,744, March 18, 1974, abandoned.

[52] U.S. Cl............................ 280/112 A; 280/717; 280/671; 267/57.1 R
[51] Int. Cl.² ....................................... B60G 11/60
[58] Field of Search ........ 280/112 R, 112 A, 124 B, 280/96.2 R; 267/57.1 R, 154, 63 R, 63 A

[56] References Cited
UNITED STATES PATENTS

| | | | |
|---|---|---|---|
| 3,181,883 | 5/1965 | Kolbe | 267/63 R |
| 3,329,233 | 4/1967 | Kolbe | 280/112 R |
| 3,556,553 | 1/1971 | Kolbe | 267/63 R |
| 3,726,542 | 4/1973 | Kolbe | 280/96.2 R |
| 3,851,893 | 12/1974 | Kolbe | 280/112 A |
| 3,879,051 | 4/1975 | Kolbe | 280/124 B |

Primary Examiner—M. H. Wood, Jr.
Assistant Examiner—John A. Carroll
Attorney, Agent, or Firm—Andrus, Sceales, Starke & Sawall

[57] ABSTRACT

A curvebank vehicle superstructure is supported by curvebank arms which extend between the vehicle axles and the superstructure and comprise torsionally operated springs and pairs of multiturn cushions kept under compression by the springs and resting against the vehicle axles and the superstructure respectively. Pivotal connections are placed between the respective multiturn cushion pairs to secure exactness in the geometric line-up of the related banking arm structural members. The axle supported cushion pairs are placed with their cushion centers along an essentially transversely extending line. Each pair of the superstructure supported cushions is placed along a line extending diagonally from the related superstructure supported pivotal connection directed outwardly towards the related axle supported wheel, and continuingly directed inwardly towards the centrally located vehicle district.

17 Claims, 4 Drawing Figures

VEHICLE BANKING ARM CONSTRUCTION

CROSS REFERENCES TO RELATED APPLICATIONS

This is a continuation of application Ser. No. 451,744, filed Mar. 18, 1974 now abandoned.

This application is closely related to the applications U.S. Ser. No. 251,831, filed May 9, 1972 (Single Leaf Truss) now Pat. No. 3,826,514, and U.S. Ser. No. 324,754, filed Jan. 18, 1973 (Torque Control Pivot) now Pat. No. 3,879,051, by the present inventor and copending herewith.

BACKGROUND OF THE INVENTION

1. Field of the Invention

This invention pertains to the suspension structure for automotive vehicles and the like, and in particular to an improved vehicle banking arm construction for resiliently supporting the superstructure of curvebank cars to secure inward lean of the superstructure during curve ride of the vehicle.

2. Description of the Prior Art

The invention is applicable to and capable of selected combinations with vehicle banking arm constructions of the type disclosed in the U.S. Pat. No. 3,181,883, issued May 4, 1965, (Rubber Cushions), U.S. Pat. No. 3,556,553, issued Jan. 19, 1971, (Polyurethane Cushions), and U.S. Pat. No. 3,726,542, issued Apr. 10, 1973, (Rigid Front Axle), as well as to the above cited pending applications.

Heretofore the selected positioning and operation of the superstructure carried multiturn cushions was disclosed by this inventor as confined to and kept within a space located between the respective superstructure and axle carried banking arm ball joints and arranged outwardly from their longitudinally extending connecting line on each side of the vehicle, in order to secure the desired functioning of the device with regard to wheel oscillation, torsional windup of the related spring leaf and geometric guidance for the superstructure into the inwardly inclined or banked position during curve ride of the vehicle.

In applicant's U.S. Pat. No. 3,851,893, he discloses a new favorable location for the superstructure carried multiturn cushions of the related banking arm. With introduction of a designed extension of the banking arm structure now reaching from the related wheel axle over the pivotal connection with the superstructure towards the district nearer the mid-section of the superstructure, a position for the cushion was found with its assigned location at the end of said extension and closer to the longitudinal, vertical center plane than the related superstructure supported banking arm ball and socket joint. Again such position, in combination with an adjusted torsional pressure operation secured the desired functioning of the device with regard to wheel oscilation, torsional windup of the related spring leaf, and geometric guidance for the superstructure into the inwardly inclined or banked position during curve ride.

SUMMARY OF THE INVENTION

The subject matter of this invention constitutes a redistribution of some of the structural elements comprising a curvebank arm, in order to improve a weight and space use and to avoid shock transfer from the vehicle wheels and wheel spindles to the superstructure previously resulting through a direct chain of metal parts, rigid or resilient, altogether, with a newly devised selective positioning of the related multiturn cushions, now arranged in pairs and forming a part of said structural elements.

This invention combines in effect the ideas which brought about the two separate locations developed for the multiturn cushions with regard to the need for the varied performance requirements as described above.

A main object of the invention is to secure a maximum of insulation, through improved positioning and shaping of the multiturn cushions, between the spindle carried wheels in their vertical oscillation and the vehicle superstructure, by having the superstructure load transferred to the wheels over the interpositioned cushions, breaking the flow of the forces over metallic suspension members at least once for each banking arm by pairs of multiturn cushions, each cushion operating as a means of damping effectively, both with regard to static compression and to dynamic shear motion said load transfer. Advantages of weight reduction, height reduction, cantilever length reduction of the related members as well as reduced motions per unit during banking of the superstructure are important contributions for achieving a further improved ride and a lower vehicle profile.

BRIEF DESCRIPTION OF THE DRAWINGS

The accompanying drawings illustrate the best mode presently contemplated for carrying out the invention.

In the drawings.

DESCRIPTION OF THE PREFERRED EMBODIMENT

Figure 1:
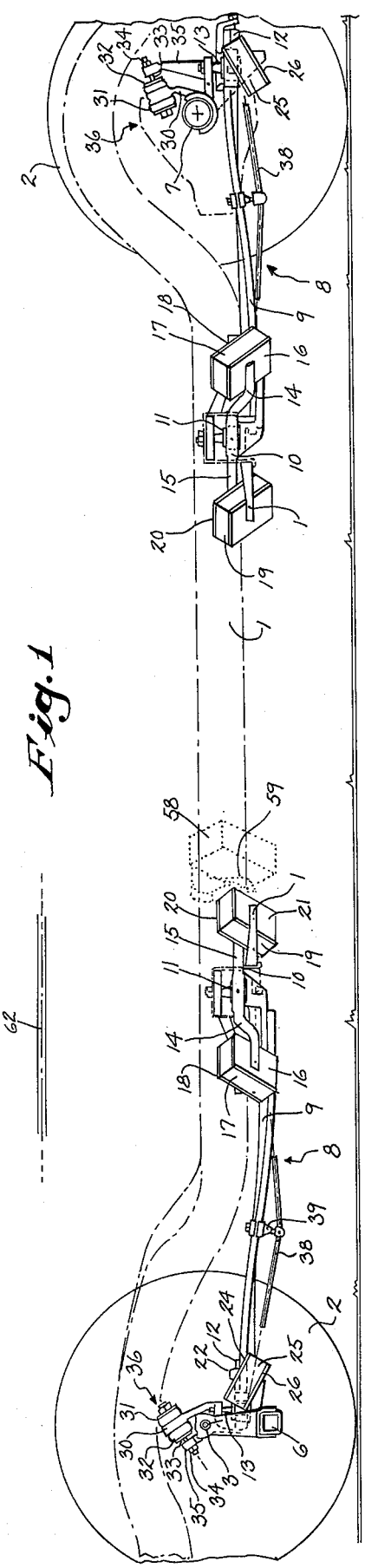
FIG. 1 is a side elevation of a banking arm supported vehicle superstructure including front and rear rigid axles and illustrating the superstructure carried multiturn cushion pairs placed in accordance with this invention.
Figure 2:
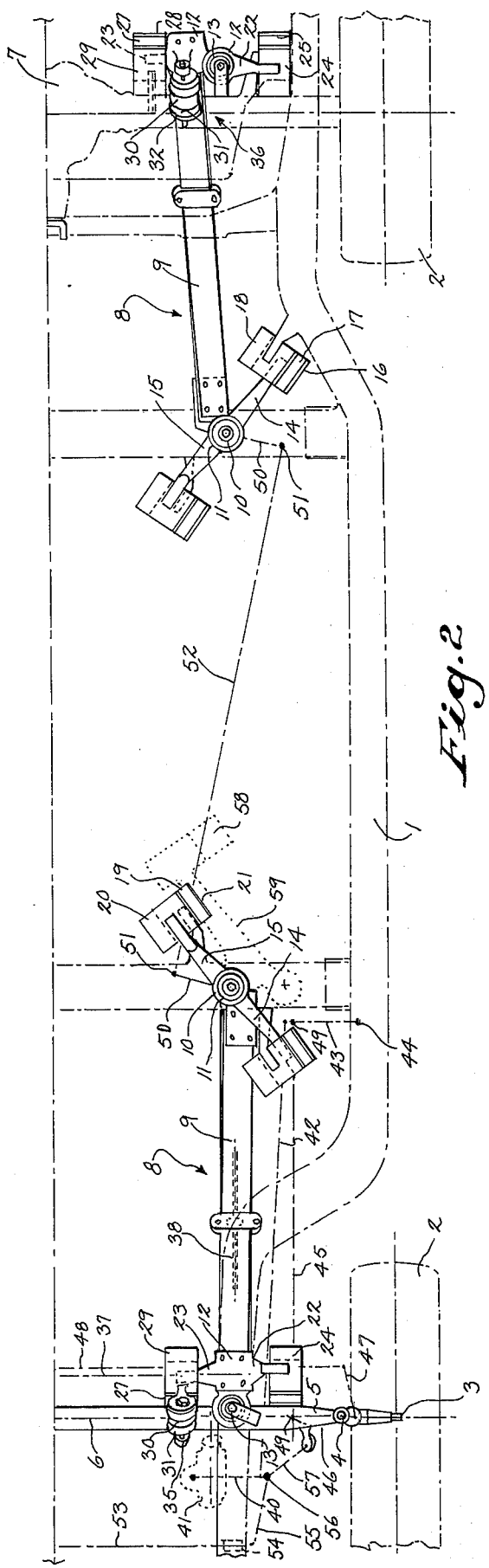
FIG. 2 is a half section of the curvebank vehicle chassis structure shown in FIG. 1, as it appears in top view in its static height position.

FIGS. 1 and 2 illustrate in side view and top view respectively a vehicle superstructure having a chassis or body support frame 1 supported by the wheels 2. The left hand half only of the vehicle is shown in top view and assumed to be essentially mirror-like to the respective right-hand half. The wheels 2 are arranged in pairs, one pair at the front and the other pair at the rear end of the vehicle. The wheels of each pair are disposed on opposite sides of the superstructure and are equally spaced from the longitudinal, vertical center plane of the vehicle.

The front wheels 2 are each, in the modification illustrated, supported by a wheel spindle member 3 pivotally connected by a kingpin pivot 4 to the outer end 5 of a rigid front axle 6 extending transversely between the two front wheels 2.

The rear wheels 2 are carrying a rigid axle housing structure 7. The front axle 6 and the rear axle housing structure 7 each are supporting the respective ends of a related pair of banking arms 8 which are supported at their other ends by the frame 1.

Each banking arm comprises a torsionally operated leaf spring 9, preferably in form of a single leaf connected at one end by a support bracket 10 for the support of the banking arm ball and socket joint 11, which connects said end of the banking arms 8 to the frame 1. The other end of the respective leaf spring 9 is held by the support bracket 12 for the support of the banking arm ball and socket joint 13, which connects said end of the banking arm 8 to the rigid axle 6 in the front, and to the rigid axle housing structure 7 in the rear of the vehicle, respectively.

Each support bracket 10 extends substantially horizontally and diagonally away from the related ball and socket joint 11 in both directions along a straight axis line, forming two support half-arms 14 and 15, whereby the half-arm 14 extends from the ball joint 11 outwardly towards the nearest wheel while the other support half-arm 15 extends along the extension of the support half-arm 14 inwardly towards the center district of the vehicle.

Each support half-arm 14 is shaped at its end into an operating plate 16 which supports from below a multiturn cushion 17 of substantially rectangular shape and positioned inclined to the roadbed at an angle of about 35 to 45°, and inclined to the longitudinally and vertically extending center plane of the vehicle at an angle of approximately 50 to 60° as measured between its long side and the said vehicle center plane. All four edges of the multiturn cushion 17 not extending inclined to the roadbed are extending parallel thereto with each upper inner edge positioned closest to said vehicle center plane. An upper carrier plate 18 covers the multiturn cushion 17 from above and is carried by the frame 1.

A second multiturn cushion 19 supported from above by an operating plate 20 at the end of the support half-arm 15 and carried from below by a carrier plate 21 supported from below by the vehicle frame 1, with all related edges of the cushion 19 extending parallel to those of the multiturn cushion 17. The distance between the centers of the multiturn cushions 17 and 19 is approximately one-third to one-half of the distance between the ball joints 11 and 13 with the ball joint 11 preferably placed at an equal distance between the cushions 17 and 19. The cushions 17 and 19 are referred to hereinafter as "cushion pairs".

The support bracket 12 extends substantially horizontally and transversely away from the related ball and socket joint 13 in both directions forming two support half-arms 22 and 23, whereby the half-arm 22 extends from the ball joint 13 outwardly towards the nearest wheel 2 while the half-arm 23 extends inwardly towards the center district of the respective rigid axle 6, 7.

Each support half-arm 22 is shaped at its end into an operating plate 24 against which from below the multiturn cushion 25, formed into a substantially rectangular shape, rests. The cushion 25 extends with its longer sides longitudinally of the vehicle and is positioned inclined to the road at an angle of approximately 30°, with its lower edge of its lower surface placed farther away from the respective axle 6, 7 than its respective upper edge. A carrier plate 26 supports the multiturn cushion 25 from below and is carried by the respective axle 6, 7.

The support half-arm 23 supports a second multiturn cushion 27 of identical shape and inclination as the cushion 25 at its outer end from below through the operating plate 28. The multiturn cushion 27 is resting against the carrier plate 29, which covers the cushion 27 from above and is itself supported by the respective axle 6, 7. The distance between the centers of the multiturn cushions 25 and 27 are approximately one-fourth to one-third of the distance between the ball and socket joints 11 and 13 with the ball joints 13 preferably placed at an equal distance between the cushions 25 and 27, which also are referred to hereinafter as "cushion pairs."

FIGS. 1 and 2 illustrate in dotted outline a multiturn cushion 58 and the related support arm 59 as previously incorporated by this inventor in the later banking arm designs, in order to show the improvements secured with this invention, with regard to space use and weight reduction.

Each axle 6 and 7 carries an upwardly directed arm 30 which supports at its ring-formed upper end two bushings of resilient material 31 which are resting between two enclosure discs 32 and which are kept under pressure by a bolt 33 with corresponding end nuts 34. Each support bracket 12 also carries an upwardly directed arm 35 which pivotally receives at its upper end the extended bolt 33. The pivotal assembly as a whole constitutes a so-called torque control pivot 36 which is selectively positioned to control any tendency of the related axle to rotate about its axis line 37 interconnecting the centers of the respective two multiturn cushions 25 and 27 supported by the related axles in response to vertically directed wheel load reaction forces.

The torque control pivots transmit the wheel load reaction forces by means of the related leaf springs 9 and the support brackets 10 to the frame 1 without the interposition of so-called torque control rods. Torque control pivots and their functions are disclosed in the pending U.S. application Ser. No. 324,754 referred to above. The tendency of the torsionally operated leaf springs 9 to bend in reaction to the forces present in the system is overcome by the addition of a truss cable 38 arranged below and extending between the respective support brackets 10 and 12 for each spring leaf, whereby a truss column 39 is positioned between the spring leaf 9 and the truss cable 38. The exact positioning of the truss column 39 depends on the desired amount of bending deflection needed to have the torque control pivot 36 control the caster or upright position of the axle not only in static height suspension position but also during wheel oscillation and during curve banking of the superstructure, as also disclosed in the application for patent, Ser. No. 324,754 referred to above.

FIG. 2 further illustrates, schematically only, the front wheel steering linkage as it is essential for a curvebank vehicle comprising a rigid front axle. The linkage comprises the horizontally extending lever 40, which might be considered the Pitman arm of the steering gear mechanism enclosed by a gear housing 41 mounted on the frame 1 to locate the arm as illustrated.

The lever 40 is pivotally connected at its outer end to a tie-rod 42 supported by the lever arm 43 which is pivotally supported by the vertically extending pivot 44 carried by the frame 1. The lever arm 43 also carries the backward end of the steering drag link 45, whose forward end is connected to the spindle arm 46, which extends into the steering arm 47. A cross steering tie-rod 48 extends between the steering arm 47 and the corresponding steering arm located on the other side of the vehicle.

All tie rod and drag link ends are connected to their respective support arms by ball and socket joints 49.

Each of the two support brackets 10 located on one side of the vehicle also carry an arm 50 sidewardly extending in a direction opposite to each other in relation to the two end sections of the vehicle, whereby each of said arms carries a ball and socket joint 51 on its free end, supporting the ends of a front to rear tie rod 52 arranged to secure lateral operation in unison of the front and rear pairs of banking arms 8 during the roll turn of the superstructure into a banked position.

Each frame end supports a sway bar 53 as illustrated in FIG. 2 in bushings 54, with the longitudinally extending sway bar arms 55 connected to the resilient bushings 56 at their upper ends to the sway bar shackles 57 which in turn are connected by resilient bushings at their lower ends to the respective axles closest to them.

Figure 3:
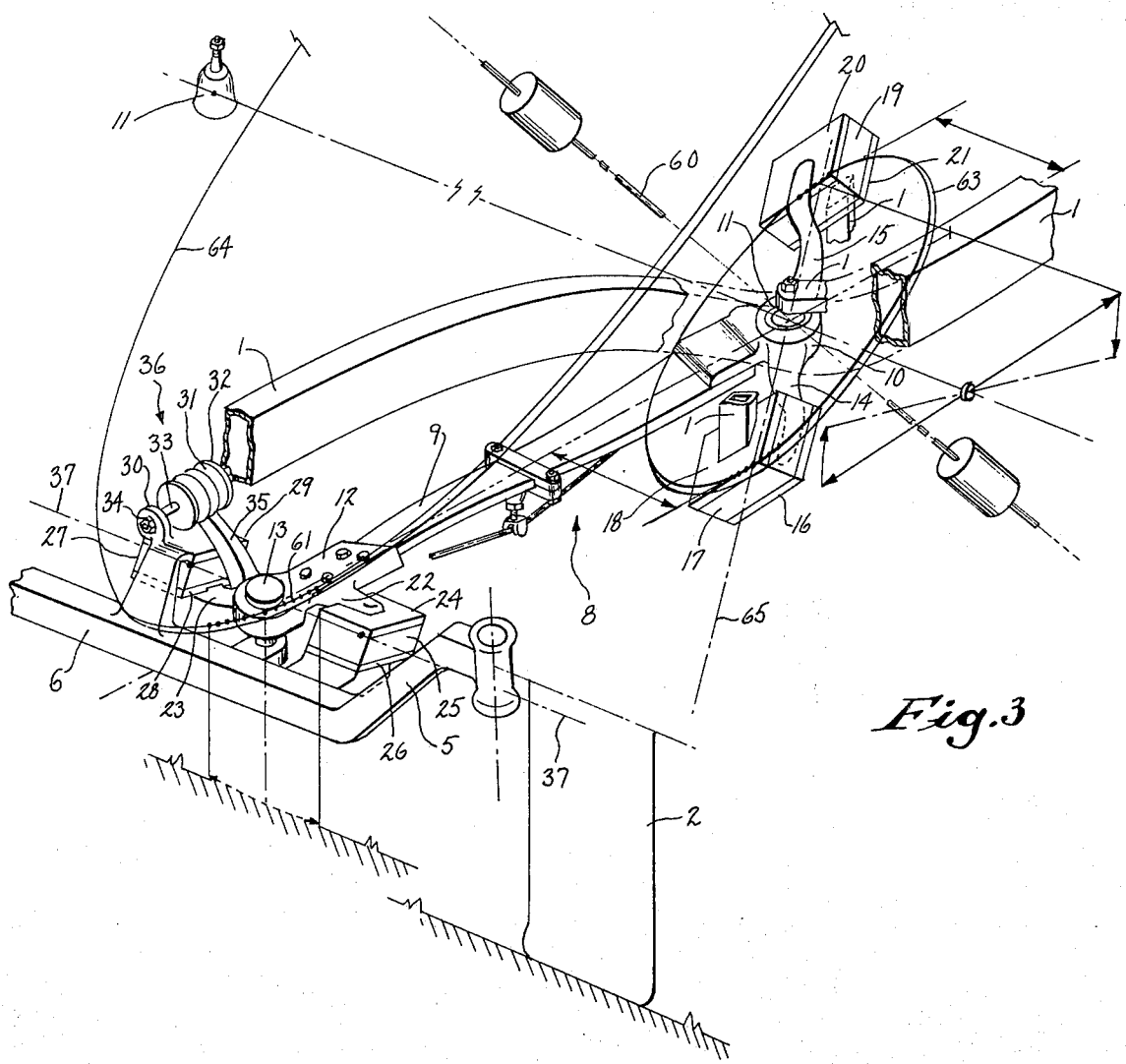
FIG. 3 is a perspective detailed view of a lefthand front end banking arm shown, illustrating both respective axle and superstructure supported pairs of multiturn cushions placed to fit into the related curvebank arm geometry illustrated.

FIG. 3 illustrates in perspective outline the left front banking arm 8 and its support structure as shown in FIGS. 1 and 2 and fitted into the geometric pattern developed for the banking arm to perform the many functions the mechanism is capable of.

The dominating factor of the banking arm system is the carefully selected position of the banking arm axis 60 shown in a distinct outline extending between two small cylinders, which allows a clear reading of its position relative to the three main planes of the vehicle. The structural elements shown are given the numerals selected for FIGS. 1 and 2.

The vehicle front axle 6, supported by the wheel 2 carries the front banking arm ball joint 13 which carries the support of bracket 12 which in turn is connected to the front end of the torsionally operated leaf spring 9. The rearward end of spring 9 is connected to the support bracket 10 which carries the banking arm ball and socket joint 11 which is supported by the vehicle frame 1.

Figure 4:
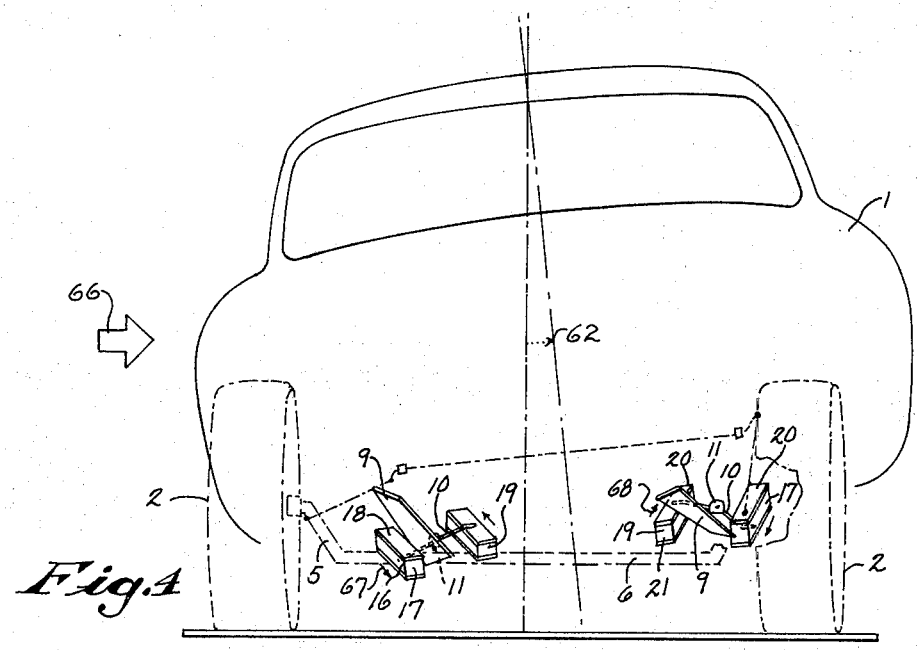
FIG. 4 is a schematic front elevation of the front end of the vehicle having its superstructure mounted as shown in FIGS. 1 and 2 and turned into a roll banked position, looking forwardly toward the front axle and in particular illustrating the positions thereby taken by the superstructure supported multiturn cushion pairs at the axle.

The banking arm axis 60 is determined in its position by the positioning of the multiturn cushions 17 and 19 relative to the selected position of the ball joint 11 through which the banking arm axis extends. In general, it is desirable that the edges of multiturn cushions 17 and 19 representing the height or thickness of the cushion are substantially parallel to the axis 60. The inclination of the axis 60 relative to the three main vehicle planes determine the travel path 61 for the ball joint 13 which, in combination with a mirror-like travel path for the related ball joint 13 located on the other side of the vehicle determine, under consideration of the respective torsional leaf spring deflections, as they occur during vehicle curve ride, the position of the secondary roll center 62 as shown in FIG. 4 and which coincides in its location with the mass center of the superstructure and about which the superstructure can relatively easily turn during curve ride and move into its desired position inclined towards the inside of the curve.

FIG. 3 illustrates how the centers of the cushion pair 17-19 in effect during shear deformation travel along the periphery of a circular line 63, appearing in FIG. 3 as an elipsis, positioned at 90° relative to the banking axis outline 60. The travel path for the ball joint 13 is illustrated along the periphery of, in effect, a circular outline 64, whose center is also located along the banking axis 60 and in particular along that section of the circular outline which has the minimum of longitudinal change in its distance from the axle during the lateral and vertical travel displacements, as well as an equal longitudinal change on both sides of the vehicle during the curvebank turn of the superstructure, however small this longitudinal change might be. True transverse position of the axle 6 both during vehicle straight ahead ride and during curve ride is thereby secured.

The subject matter of this invention is the use of multiturn cushion pairs in combination with a single ball and socket joint per pair, where in past designs of this inventor a single cushion in combination with a related banking arm ball and socket joint was employed to secure the desired position of the banking arm axis and the related travel path for the corresponding axle supported banking arm ball joint.

As the reference to the multiturn cushion 58, shown in dotted outline in FIGS. 1 and 2 indicates, the positioning, operation and functioning of the multiturn cushions 17 and 19 is similar to the use of a single cushion in combination with a single ball joint. Both cushions are placed along the axis line 65 which extends parallel to the roadbed and is generally at right angles to banking axis 60 and diagonally inclined to the transversely and longitudinally extending upright vehicle planes. With upward move of the axle supported banking arm ball joint 13 about the frame supported banking arm ball joint 11, the torsionally operated spring leaf 9 takes a more inclined position as appearing in side elevation, and the multiturn cushion 17, under increased pressure exerted through the lower operating plate 16 tending to move it upwardly is kept in position, since it rests against the upper carrier plate 18 which forms a rigid part of the superstructure 1. It cannot participate in the upward move of the neighboring section of the spring leaf 9 and instead additionally winds up the leaf 9 in torsion.

Simultaneously with said upward move of the axle carried banking arm ball joint 13 the multiturn cushion 19, being located in the extended section of the banking arm 8, now under increased pressure exerted through the upper operating plate 20 tending to move the cushion downwardly, is kept in position since it rests against the lower carrier plate 21 which forms a rigid part of the superstructure 1. The cushion 19 cannot participate in the downward move of the, in effect, extension section of the banking arm 8 but also additionally winds up the torsionally operated spring leaf 9 in the same direction as the windup secured by the multiturn cushion 17.

The advantages of this new arrangement are as follows.

1. By employing two multiturn cushions 17, 19, at the frame supported end of the related banking arm 8, it is possible to space each cushion only half the distance away from the related banking arm ball joint 11 than the distance needed with use of a single cushion 58.

2. Each half-arm 14, 15, can be constructed out of far less than one-half of the metal needed for the construction of one full length arm 59 due to the difference in cantilever effect.

3. The travel path of the centers of the two multiturn cushions 12 and 19 will be halved since they are located one-half the distance away only from the related banking arm ball joint 11 compared to the use of a single cushion.

4. Since the cushion thickness is a function of the amount of shear travel of one related support plate to the other, the related shear deformations per cushion will therefore also be halved and the cushion thicknesses can be reduced to one-half of the designed thickness with use of a single cushion.

5. The top surface size of each cushion, however, has to be maintained in order to maintain the force times lever arm product needed.

6. The amount of polyurethane material needed for the new arrangement will therefore be unchanged.

7. The space needed for the construction, usually highly restricted in availability in family passenger cars below the passenger compartment floor, is now substantially reduced both with regard to the cushion placing and to the amount of shear deformation required.

In addition to the advantages of the arrangement enumerated above, a very basic improvement in ride can be secured since now the cushions as a pair 17–19 will carry the full load of the superstructure share carried by each banking arm, while the related banking arm ball and socket joint 11 is freed completely of loads exerted in a vertical direction and has to serve only as a means to secure and maintain correct positioning of the related members in the horizontal plane. Vertical shocks, resulting from wheel oscillation, are forced to travel through the cushion pairs without steel to steel engagement.

For this reason alone, the application of the cushion pair principle might be justified to support the axle carried end of the torsionally operated leaf spring 9 as well. As described for FIGS. 1 and 2, the multiturn cushions 25 and 27 are positioned between the support bracket 12 and the axle 6-7, the cushion 25 operated in shear deformation from above, the cushion 27 from below, while the banking arm ball and socket joint 13 connects the support bracket 12 to the axle. A removal of the banking arm ball joints 11 and 13 altogether would still secure transfer of the superstructure load to the wheels over the respective multiturn cushions alone, although forces active in a horizontal plane call for ball joint position holding.

During a turn of the vehicle to the left, the frame supported banking arm ball and socket joint 11 travels with the left hand superstructure section downwardly and curve outwardly, changing the angular position of the leaf spring 9 relative to the axle as appearing in top view. The half-arm 22 is pushed backwardly with its outer end, the half-arm 23 forwardly, shear deforming the multiturn cushions 25 and 27 respectively. Thereby an increase in windup of the torsionally operated leaf spring 9 takes place, compensating for the loss in windup occurring from the frame supported end of the spring where the superstructure itself during its roll into the inwardly inclined position causes an unwinding of that spring end.

The torque control pivot 36, illustrated in FIG. 3, is composed in its structure as described above and explained in its operation in the pending U.S. Patent application, Ser. No. 324,754, referred to previously.

FIG. 4 shows the superstructure 1 as pressed into the inwardly inclined position, such as during a turn of the vehicle to the right and while under the side pressure from the centrifugal force as represented by the arrow 66. The positions taken by the leaf springs 9 are shown as following with their backward ends the roll motion of the superstructure 1, while the forward ends essentially maintain their relationship to the front axle. The shear deformation of the superstructure carried multiturn cushions 17 and 19 is shown, as well as - schematically - the support brackets 10 extending from the related ball joints 11 sidewardly in both directions over the bracket half-arms 14 and 15 to the upper and lower operating plates 16 and 20 and the lower and upper carrying plates 18 and 21. The plate 16 for instance located on the right side of the vehicle, as viewed from the driver, has moved downwardly, as indicated by the small arrow 67, relative to its related superstructure carried plate 18, the plate 20, located on the left side has moved upwardly relative to its related superstructure carried plate 21 as indicated by the small arrow 68, while the centers of the cushions 17 and 19 have traveled along the circular arc 63 as shown in FIG. 3.

The structure disclosed herein is of special importance for the design of so-called small or compact cars as well as sport cars, where a low over-all profile of the car secures less wind resistance at high speeds, and where shorter wheel base and smaller vehicle wheel track benefit from a lower floor made possible by this invention, which thereby makes the many additional advantages of the curvebank car concept available to that class of cars as well.

An important consideration also is the fact that, where one half-arm within the superstructure deforms under pressure or even yields, or one multiturn cushion of the related pair supported by the arms deteriorates, the other arm or cushion will still keep the leaf spring under sufficient torsional pressure to maintain a secure structure.

After description of the basic structure and the operation and functioning of this invention reference is made to certain variations and important combinations which give a choice in the application of the device for differing kinds of vehicles and their uses, as well as best utilization of the space available for placing the device.

While the multiturn cushion pairs are so far described and illustrated as being spaced of equal distance from the related banking arm ball joints, a longer half-arm in combination with a smaller cushion can be arranged to balance a shorter half-arm with a larger cushion, without affecting the described advantage of freedom from vertical loading of said ball joint.

The application of the multiturn cushions in pairs, the main object of this invention, may be restricted to the frame supported end of the banking arm, where it is most desirable for space reasons and the resulting reduction in height of the structure, while a single multiturn cushion in combination with the required banking arm ball and socket joint might be preferable for the banking arm connection to the related axle, by placing said ball joint as near towards the end of the axle and as close to the related wheel, maintaining the advantages secured with the structure as disclosed in the U.S. Pat. No. 3,726,542, issued Apr. 10, 1973 (Rigid Front Axle) referred to above.

Various modes of carrying out the invention are contemplated as being within the scope of the following claims particularly pointing out and distinctly claiming the subject matter which is regarded as the invention.

I claim:

1. In a vehicle of the class described, having a superstructure, a banking support for the superstructure connecting the superstructure at its forward end to a wheel spindle carrying wheel supported rigid front axle structure and at its rearward end to a rigid wheel supported rear axle structure, said banking support comprising a plurality of pairs of cooperating roll banking arms, each arm including a longitudinally extending torsionally operated resilient spring means connected by a separate support member and a ball and socket joint at one end to the superstructure and at the other end to the respective rigid axle structure, side lever arms forming a part of said separate support members and bearing at their outer ends against respective resilient multiturn cushions of polyurethane based material placed near the outer ends of the resilient spring means with the related ball joints and the multiturn cushions placed a selected distance longitudinally of the vehicle from the related axle structure, and side lever arms forming a part of the related support members bearing at their ends against respective multiturn cushions of polyurethane based material supported by the superstructure, each rigid transversely extending axle structure having a predetermined orientation as appearing in side view during static loading of the superstructure by means of a control pivot pivotally interconnecting the related axle structure and at least one of its related banking arms to secure and control said orientation of the related axle structure and to carry the axle torque pressures to the superstructure through said resilient means, wherein the improvement comprises the arranging of both said superstructure supported side lever arms forming a part of the related support members, and the related multiturn cushions carried at their ends, in pairs, with the cushions of each pair placed along an axis line extending diagonally from the related banking arm ball and socket joint towards the central district of the superstructure in one direction and towards a space near the nearest vehicle wheel in the other direction, and wherein the improvement further comprises the arranging of both said axle carried side levers forming a part of the related separate support member and the related multiturn cushions carried at their ends, in pairs, with the cushions of each pair placed along an axis line extending horizontally and transversely from the related banking arm ball and socket joint towards the nearest vehicle wheel in one direction and towards the central district of the related axle structure in the other direction.

2. The vehicle of claim 1 wherein all frame supported multiturn cushions positioned in the central longitudinal district of the superstructure, and all axle supported multiturn cushions positioned nearest the related vehicle wheels are carried from below and shear deformation of the cushions is operated by the related half-arms of the respective separate support member from above, while all frame supported multiturn cushions positioned near the respective neighboring wheels and all axle supported multiturn cushions positioned near the central district of the axles are supported from above and shear deformation of the cushions is operated by the related half-arms of the respective separate support members from below.

3. The vehicle of claim 1 wherein the edge outlines of each superstructure carried multiturn cushion representing the height of each cushion extend substantially parallel to the respective banking arm axis of the related banking arm and the distance between the multiturn cushions of each pair is about one-third to one-half of the distance between the related superstructure and axle supported banking arm ball and socket joints.

4. The vehicle of claim 2 wherein the edge outlines of each superstructure carried multiturn cushion representing the height of each cushion extend substantially parallel to the respective banking arm axis of the related banking arm and the distance between the multiturn cushions of each pair is about one-third to one-half of the distance between the related superstructure and axle supported banking arm ball and socket joints.

5. The vehicle of claim 1 wherein each of said frame supported multiturn cushions of the pair is of an elongated shape positioned at an angle of approximately 35° to the roadbed and of approximately 60° to the longitudinally and vertically extending center plane of the vehicle, with the lower edges of said cushions positioned closest to said vehicle center plane.

6. The vehicle of claim 2 wherein each of said frame supported multiturn cushions of the pair is of an elongated shape positioned at an angle of approximately 35° to the roadbed and of approximately 60° to the longitudinally and vertically extending center plane of the vehicle, with the lower edges of said cushions positioned closest to said vehicle center plane.

7. The vehicle of claim 1 wherein each of said axle supported multiturn cushions of the pair is of an elongated shape positioned at an angle of approximately 30° to the roadbed and substantially parallel to the longitudinally and vertically extending center plane of the vehicle with the lower edges of the related upper face of said cushions positioned farthest away from said vehicle center plane.

8. The vehicle of claim 2 wherein each of said axle supported multiturn cushions of the pair is of an elongated shape positioned at an angle of approximately 30° to the roadbed and substantially parallel to the longitudinally and vertically extending center plane of the vehicle with the lower edges of the related upper face of said cushions positioned farthest away from said vehicle center plane.

9. The vehicle of claim 1 wherein the axis line containing the centers of the related frame supported banking arm ball and socket joint and of each related multiturn cushion of the pair forms the substantially horizontally extending axis of the effective banking universal joint, whose other axis generally perpendicular to said axis line constitutes the banking arm axis and extends inclined to the three main planes of the vehicle.

10. The vehicle of claim 2 wherein the axis line containing the centers of the related frame supported banking arm ball and socket joint and of each related multiturn cushion of the pair forms the substantially horizontally extending axis of the effective banking universal joint, whose other axis generally perpendicular to said axis line constitutes the banking arm axis and extends inclined to the three main planes of the vehicle.

11. The vehicle of claim 1 wherein the suspension and the resilient support means for the superstructure also comprise at least one transversely extending sway bar carried by the superstructure and operated by a pair of inclined sway bar shackles connecting substantially longitudinally extending sway bar arms to the related rigid axle structure, and wherein the suspension means additionally comprise a tie-rod operably extending longitudinally between one roll banking arm in the front of the vehicle and one rear roll banking arm to secure track holding of the pair of the front wheels relative to the rear wheel pair at all times.

12. The vehicle of claim 2 wherein the suspension and the resilient support means for the superstructure also comprise at least one transversely extending sway bar carried by the superstructure and operated by a pair of inclined sway bar shackles connecting substantially longitudinally extending sway bar arms to the related rigid axle structure, and wherein the suspension means additionally comprise a tie-rod operably extending longitudinally between one roll banking arm in the front of the vehicle and one rear roll banking arm to secure track holding of the pair of the front wheels relative to the rear wheel pair at all times.

13. The vehicle of claim 1 wherein the force-moment, comprising the load carried by one multiturn cushion of a related pair multiplied by the length of the related side lever arm substantially equals the force-moment, comprising the load carried by the related other multiturn cushion multiplied by the length of the related other side lever arm, in order to secure loading of the related banking arm ball and socket joint in a horizontal plane only, and to therewith have the multi-turn cushions in combination, even where unequal in individual surface size, transfer the full related vertical share of the superstructure load to the wheels, without loading the related banking arm ball and socket joints in that vertical direction.

14. A vehicle having a superstructure supported by separate pairs of correlated torsionally operated roll banking arms disposed at corresponding ends thereof with the outer ends of the banking arms secured to rigid axles, and in which the connection of the inner end of each banking arm to the superstructure and of the outer end of each banking arm to the corresponding rigid axle structure comprises a ball and socket joint and a pair of multi-turn cushions disposed laterally on opposite sides of the longitudinal torsional axis of the banking arm to resist torsional windup forces of the banking arm.

15. The vehicle of claim 14 in which the cushions of each pair connecting the banking arm to the superstructure are disposed along a line extending angularly substantially horizontally and transversely from the related ball and socket joint toward the nearest vehicle wheel in one direction and toward the central district of the superstructure in the other direction.

16. The vehicle of claim 14 in which one cushion of each pair at the inner end of each banking arm is supported against the superstructure from below by a lever arm extending laterally from the corresponding end of the torsionally operated banking arm, and the other cushion of each said pair is supported downwardly upon a superstructure bracket by a lever arm extending generally laterally in the opposite direction from the corresponding end of the torsionally operated banking arm, said lever arm being in substantial alignment with the longitudinal axis line of said lever arms passing through the center of the ball and socket joint.

17. The vehicle of claim 16 and in which the cushion at the outer end of each banking arm are supported lateral oppositely extending lever arms generally parallel to the corresponding rigid axle to which they connect with the cushion on the opposite side of the banking arm from said first named one cushion being supported downwardly against a bracket of said rigid axle and the cushion on the opposite side of the banking arm from said other cushion being supported upwardly against a bracket of said rigid axle to thereby provide for torsional windup of said banking arm between said pairs of cushions.

* * * * *

UNITED STATES PATENT AND TRADEMARK OFFICE
CERTIFICATE OF CORRECTION

PATENT NO. : 3,980,317
DATED : September 14, 1976
INVENTOR(S) : Joachim Kolbe

It is certified that error appears in the above-identified patent and that said Letters Patent are hereby corrected as shown below:

Column 12, line 19, Cancel "arm", second occurrence, should read -- arms --.

Signed and Sealed this

Eighth Day of March 1977

[SEAL]

Attest:

RUTH C. MASON
*Attesting Officer*

C. MARSHALL DANN
*Commissioner of Patents and Trademarks*